United States Patent
Arimilli et al.

[11] Patent Number: 6,128,705
[45] Date of Patent: *Oct. 3, 2000

[54] METHOD AND APPARATUS FOR EXECUTING MULTIPLY-INITIATED, MULTIPLY-SOURCED VARIABLE DELAY SYSTEM BUS OPERATIONS

[75] Inventors: Ravi Kumar Arimilli, Austin; John Michael Kaiser, deceased, late of Cedar Park, by Eileen T. Kaiser, independent administratrix; Derek Edward Williams, Austin, all of Tex.

[73] Assignee: International Business Machines Corporation, Armonk, N.Y.

[*] Notice: This patent is subject to a terminal disclaimer.

[21] Appl. No.: 09/004,148

[22] Filed: Jan. 7, 1998

[51] Int. Cl.[7] .................................................. G06F 13/00
[52] U.S. Cl. .................... 711/141; 711/146; 711/167; 711/119; 709/248
[58] Field of Search ..................... 711/137, 141, 711/146, 167, 119, 120, 121, 124; 709/248, 400

[56] References Cited

U.S. PATENT DOCUMENTS

| | | | |
|---|---|---|---|
| 5,210,861 | 5/1993 | Shimoda | 709/248 |
| 5,222,229 | 6/1993 | Fukuda et al. | 709/248 |
| 5,353,436 | 10/1994 | Horst | 709/400 |
| 5,388,224 | 2/1995 | Maskas | 710/104 |
| 5,442,758 | 8/1995 | Slingwine et al. | 707/8 |
| 5,548,733 | 8/1996 | Sarangdhar et al. | 710/106 |
| 5,548,767 | 8/1996 | Langendorf | 709/227 |
| 5,553,266 | 9/1996 | Metzger et al. | 711/144 |
| 5,561,779 | 10/1996 | Jackson et al. | 711/122 |
| 5,745,698 | 4/1998 | Allen | 709/248 |
| 5,958,019 | 9/1999 | Hagersten et al. | 709/400 |

*Primary Examiner*—Glenn Gossage
*Attorney, Agent, or Firm*—Mark E. McBurney; Richard A. Henkler

[57] ABSTRACT

A method and apparatus for preventing the occurrence of deadlocks from the execution of multiply-initiated multiply-sourced variable delay system bus operations. In general, each snooper excepts a given operation at the same time according to an agreed upon condition. In other words, the snooper in a given cache can accept an operation and begin working on it even while retrying the operation. Furthermore, none of the active snoopers release an operation until all the active snoopers are done with the operation. In other words, execution of a given operation is started by the snoopers at the same time and finished by each of the snoopers at the same time. This prevents the ping-pong deadlock by keeping any one cache from finishing the operation before any of the others.

20 Claims, 5 Drawing Sheets

METHOD AND APPARATUS FOR EXECUTING MULTIPLY-INITIATED, MULTIPLY-SOURCED VARIABLE DELAY SYSTEM BUS OPERATIONS

CROSS-REFERENCE TO RELATED APPLICATIONS

The present patent application is related to Ser. No. 09/004,144 entitled "METHOD AND APPARATUS FOR EXECUTING MULTIPLY-INITIATED MULTIPLY-SOURCED VARIABLE DELAY SYSTEM BUS OPERATIONS" which is hereby incorporated by reference herein.

The present patent application is related to Ser. No. 09/004,137 entitled "METHOD AND APPARATUS FOR EXECUTING MULTIPLY-INITIATED, SINGLY-SOURCED VARIABLE DELAY SYSTEM BUS OPERATIONS" which is hereby incorporated by reference herein.

The present patent application is related to Ser. No. 09/004,149 entitled "METHOD AND APPARATUS FOR EXECUTING SINGLY-INITIATED, SINGLY-SOURCED VARIABLE DELAY SYSTEM BUS OPERATIONS" which is hereby incorporated by reference herein.

The present patent application is related to Ser. No. 09/004,146 entitled "METHOD AND APPARATUS FOR EXECUTING SINGLY-INITIATED, MULTIPLY-SOURCED VARIABLE DELAY SYSTEM BUS OPERATIONS" which is hereby incorporated by reference herein.

The present patent application is related to Ser. No. 09/004,147 entitled "METHOD AND APPARATUS FOR EXECUTING VARIABLE DELAY SYSTEM BUS OPERATIONS OF DIFFERING CHARACTER USING SHARED BUFFERS" which is hereby incorporated by reference herein.

BACKGROUND

1. Field of the Present Invention

The present invention generally relates to data processing systems, and more specifically, to methods and apparatuses residing in such systems that prevent the occurrence of deadlock from the execution of multiply-initiated multiply-sourced variable delay system bus operations from producing deadlock.

2. History of Related Art

The evolution of the computer industry has been driven by the insatiable appetite of the consumer for ever increased speed and functionality. One species which has evolved from the above is the multi-processor computer.

Multi-processor systems, in similarity to other types of computer systems, have many different areas that are ripe for improvements. One such area is the processing of variable delay system bus operations.

Modern multi-processor systems typically include a number of processing elements, and a main memory, each of which are connected by a series of buses that ultimately terminate in a common system bus. The processing elements usually include a processor having a pre-determined amount of on-board cache and, in some cases, a cache hierarchy. The cache hierarchy, typically, includes a number of caches (e.g. level 0–2) which are interposed between the processor and the common system bus.

In general, operations, in such multi-processor systems, are performed by the processor, residing at the top of the cache hierarchy, placing an operation on the bus between the processor and the first off-board cache. The first off-board cache then propagates the operation, if necessary, to the next lower level cache, if it exists, which then repeats the propagation down the cache hierarchy, if necessary, until the operation finally arrives at the system bus.

Once the operation has arrived at the system bus, it is then snooped by all the caches monitoring the system bus. After a snooping cache detects an operation, it must determine whether or not the execution of the snooped operation can proceed. A cache may be unable or refuse to accept (execute) a snooped operation for any number of reasons For example, the resources necessary to execute an operation, such as the cache directory or state machines to process the snooped operation may be busy with other work and unable to process the snooped operation. In general, most system bus protocols allow any operation to be refused when a bus participant is unable to process the operation.

If the snooping cache cannot process the operation, then it will send a "RETRY" signal on the system bus. The RETRY signal informs the initiator of the operation that execution thereof was unsuccessful, and that the operation should be re-tried, if still necessary, at a later point in time.

The amount of time that a participant has in order to make a decision concerning the acceptance of a snooped operation, and to send a snoop response (e.g. "RETRY") is usually fixed for any given system via the bus protocol. Unfortunately, there are certain operations, due to their very nature, for which it is essentially impossible to determine the snoop response in the fixed period set by most bus protocols.

In example, the PowerPC™ architecture uses a TLB-SYNC operation which requires that all TLBIE operations previously issued by the processor issuing the TLBSYNC have completed on all other processors in the system. As a direct result of the above requirement, all other processors in the system must be polled in order to determine if the previously issued TLBIE operations have completed. In this case, the TLBSYNC operation must be propagated from the system bus to the top of each of the cache hierarchies to interrogate the other processors in the system. Those skilled in the art will readily recognize that a variable amount of time is required in order to propagate the TLBSYNC operation from the system bus to the processors at the top of each of the cache hierarchies. Thus making it extremely difficult, if not impossible, to determine the "correct" snoop response (e.g. "RETRY/No RETRY") within the fixed time period set by most bus protocols.

It is just these types of operations which increase the likelihood of a deadlock occurring within the system. For example, assume that an operation is placed on the system bus by one participant (i.e. an initiator) and snooped by two other participants (recipients). During the first initiation of the operation, both recipients snoop the operation, transmit a "RETRY" signal on the system bus, and begin propagating the operation to the top of their respective cache hierarchies.

Note that recipients must initially respond RETRY. For the TLBIE/TLBSYNC example, it is possible that there are previously unfinished TLBIE operations present in other processors and the TLBSYNC cannot be allowed to complete in the event unfinished TLBIE operations exist in the processors. The lowest level cache cannot determine whether previous TLBIE operations are present until the processors at the top of each of the cache hierarchies have been polled.

In response to receiving the RETRY signals, the initiator waits a potentially variable period of time before re-initiating the operation. In the current example, also assume that before the initiator re-attempts the operation, the first snooper finishes the execution thereof, and the second snooper fails to complete the execution of the operation. Thus, the scenario for the occurrence of a deadlock is created.

After the operation is re-attempted (second time) by the initiator, the second snooper transmits a "RETRY" signal on the system bus. Since the first snooper has already completed the operation (as first initiated), it accepts the re-attempt as a new operation, thus beginning again the prorogation of the operation to the top of its cache hierarchy.

In the current example, further assume that the second snooper has now completed the operation (first attempt), and the initiator now has, once again, re-attempted (third attempt) the operation on the system bus. In this scenario, the second snooper accepts the re-attempt as a new operation, and the first snooper transmits a "RETRY" signal on the system bus.

Further assume that the first snooper has completed the operation (second attempt). Once again, the initiator re-attempts (fourth time) the operation on the system bus, and the above noted process repeats indefinitely. This type of repetition is known in the industry as a "Ping-Pong deadlock".

Note that, in general, a Ping-Pong deadlock scenario can exist when there are more than two recipients as described above. In the most general case, a Ping-Pong deadlock can occur whenever one or more participants have not finished an operation and at least one participant has finished an operation when it is re-presented by the initiator. The snooper or snoopers that have finished the operation can change dynamically between initiations of the operation. This makes a Ping-Pong deadlock more likely to occur in systems with larger numbers of participants.

It would, therefore, be a distinct advantage to have a method and apparatus that would allow execution of multiply-sourced, multiply-initiated variable time operations while avoiding a Ping-Pong deadlock. The present invention provides such a method and apparatus.

SUMMARY OF THE PRESENT INVENTION

The present invention is a method and apparatus for preventing the occurrence of deadlocks from the execution of multiply-initiated multiply-sourced variable delay system bus operations. In general, each snooper excepts a given operation at the same time according to an agreed upon condition. In other words, the snooper in a given cache can accept an operation and begin working on it even while retrying the operation. Furthermore, none of the active snoopers release an operation until all the active snoopers are done with the operation. In other words, execution of a given operation is started by the snoopers at the same time and finished by each of the snoopers at the same time. This prevents the ping-pong deadlock by keeping any one cache from finishing the operation before any of the others.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
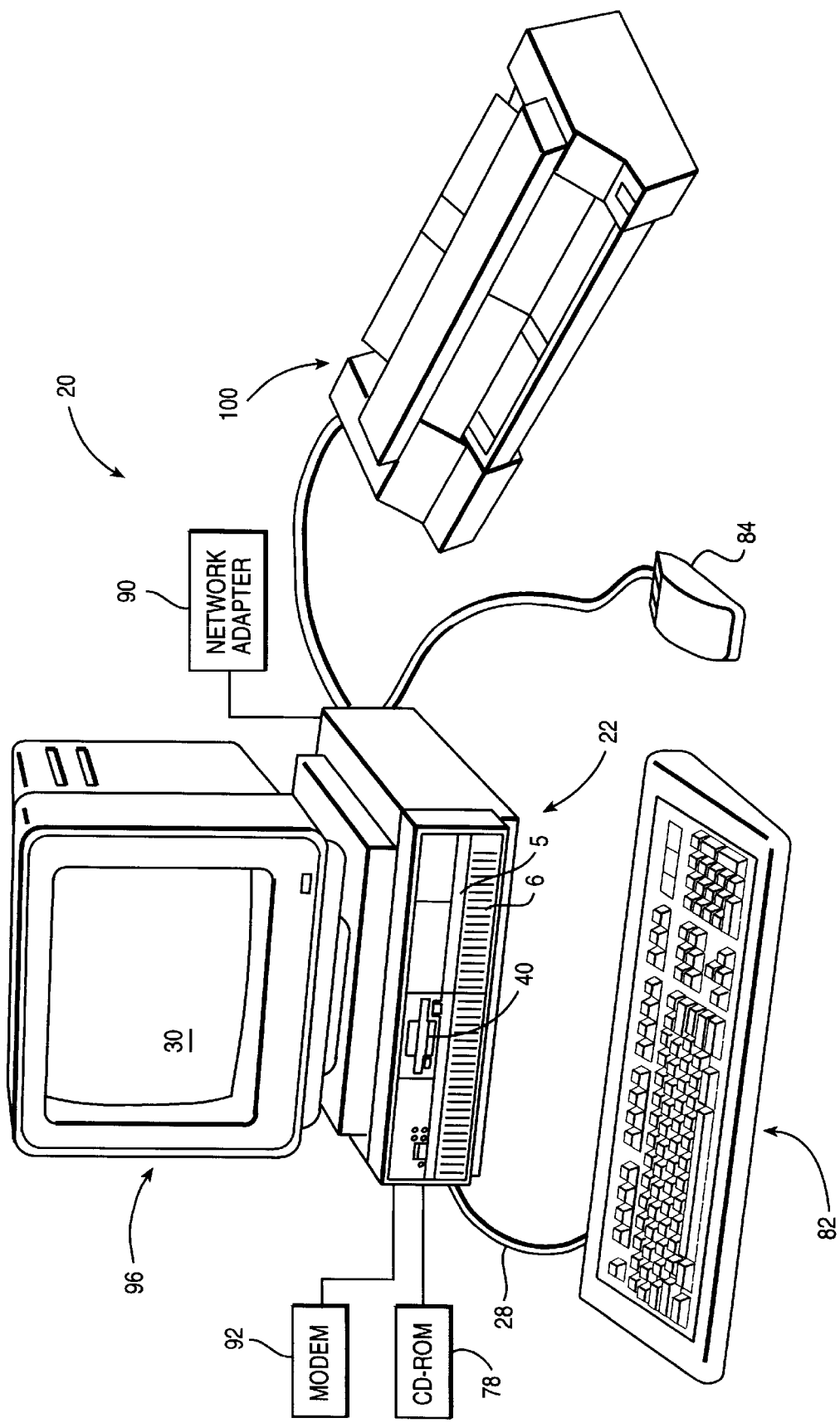
FIG. 1 is a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or by a mouse as illustrated. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
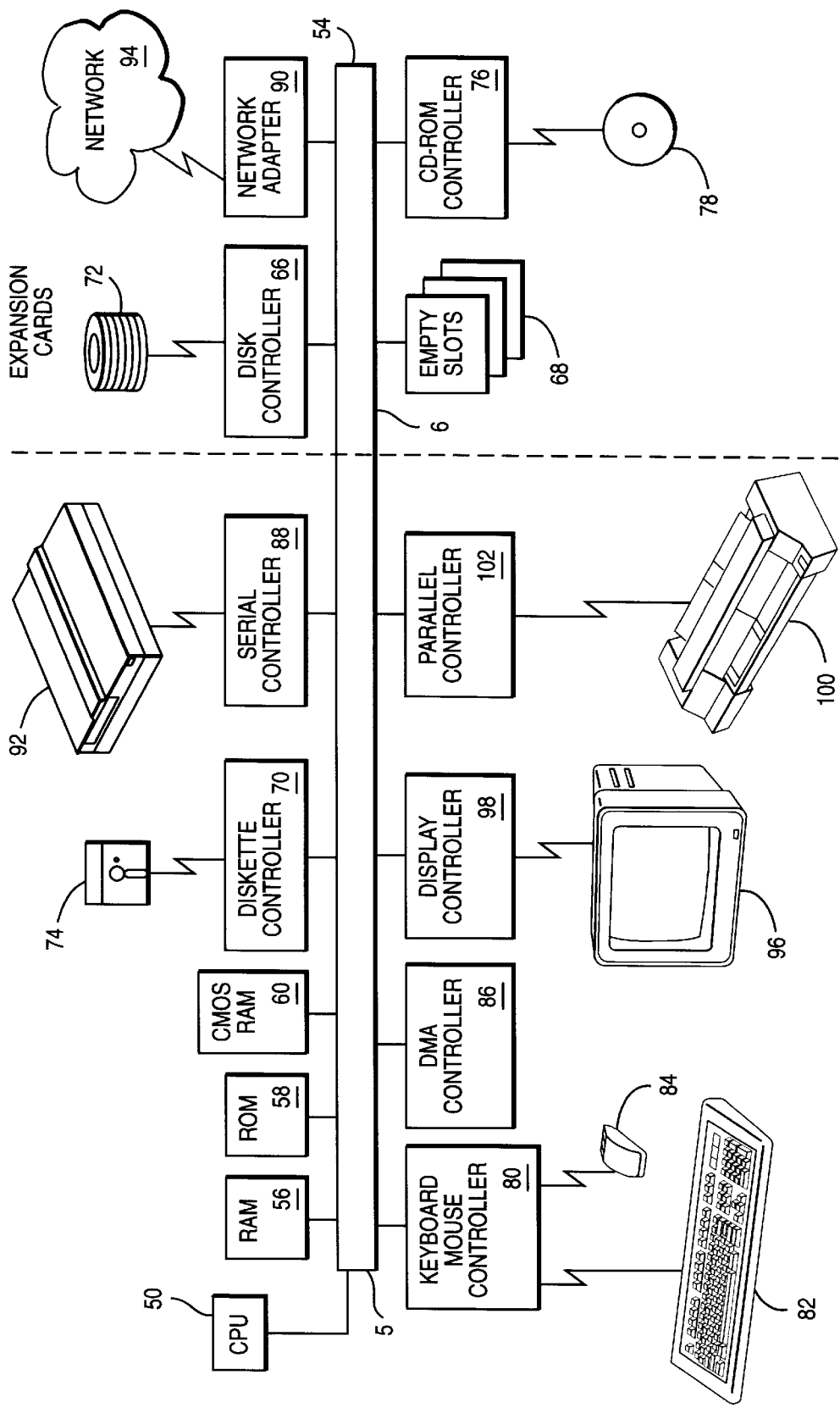
FIG. 2 is a high level block diagram illustrating selecting components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. Rooms contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-Rooms use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software or information, such as a server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other types of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Variable time operations in such computing systems have two essential characteristics. The first of these is whether the operation can be, during a given time interval, initiated by multiple participants. In other words, whether more than one participant can have the given operation outstanding at a given point in time. Hereinafter, this characteristic will be referred to as being singly- or multiply-sourced. If a given operation is only permitted to be issued until completion by one participant at a time, the operation will be referred to as singly-sourced. Likewise, if the operation may be outstanding from more than one participant simultaneously, it will be referred to as multiply-sourced.

Furthermore, operations can be characterized as multiply-initiated or singly-initiated. An operation is singly-initiated if any given participant is only allowed to have one operation of the given type outstanding at a time. Likewise, if a participant is allowed to have multiple operations of the given type outstanding at a time, the operation is referred to as multiply-initiated. Multiply-initiated operations require that an "address" be presented on the bus with the operation to distinguish between the various instances of the operation outstanding at any given moment in time.

Most bus protocols include a number of signals that are referred to collectively as the address of an operation. However, in what follows, address is construed to only mean that portion of the signals in the bus protocol that are necessary to distinguish between different instances of a multiply-initiated operation. These signals can correspond to the address signals for the given bus protocol, some subset of the address signals for the given bus protocol, or either of the aforementioned with such other signals in the bus protocol as are necessary to distinguish between multiply-initiated operations.

It is possible for an operation to be singly-sourced, but multiply-initiated and likewise for an operation to be multiply-sourced, but singly-initiated. One characteristic (multiply-sourced vs. singly-sourced) determines the number of participants allowed to have an operation of a given type outstanding. The other characteristic (multiply-initiated vs. singly-initiated) determines the number of operations of a given type a participant is allowed to have outstanding simultaneously. Typically these characteristics of operations are defined by the "architecture" of the given computer system and the computer system will not function correctly if software violates these restrictions, by, for example, having multiple processors simultaneously issue a singly-sourced operation. The apparatus of the present invention provides a means and a system for deadlock free execution of multiply-sourced, multiply-initiated operations.

Figure 3:
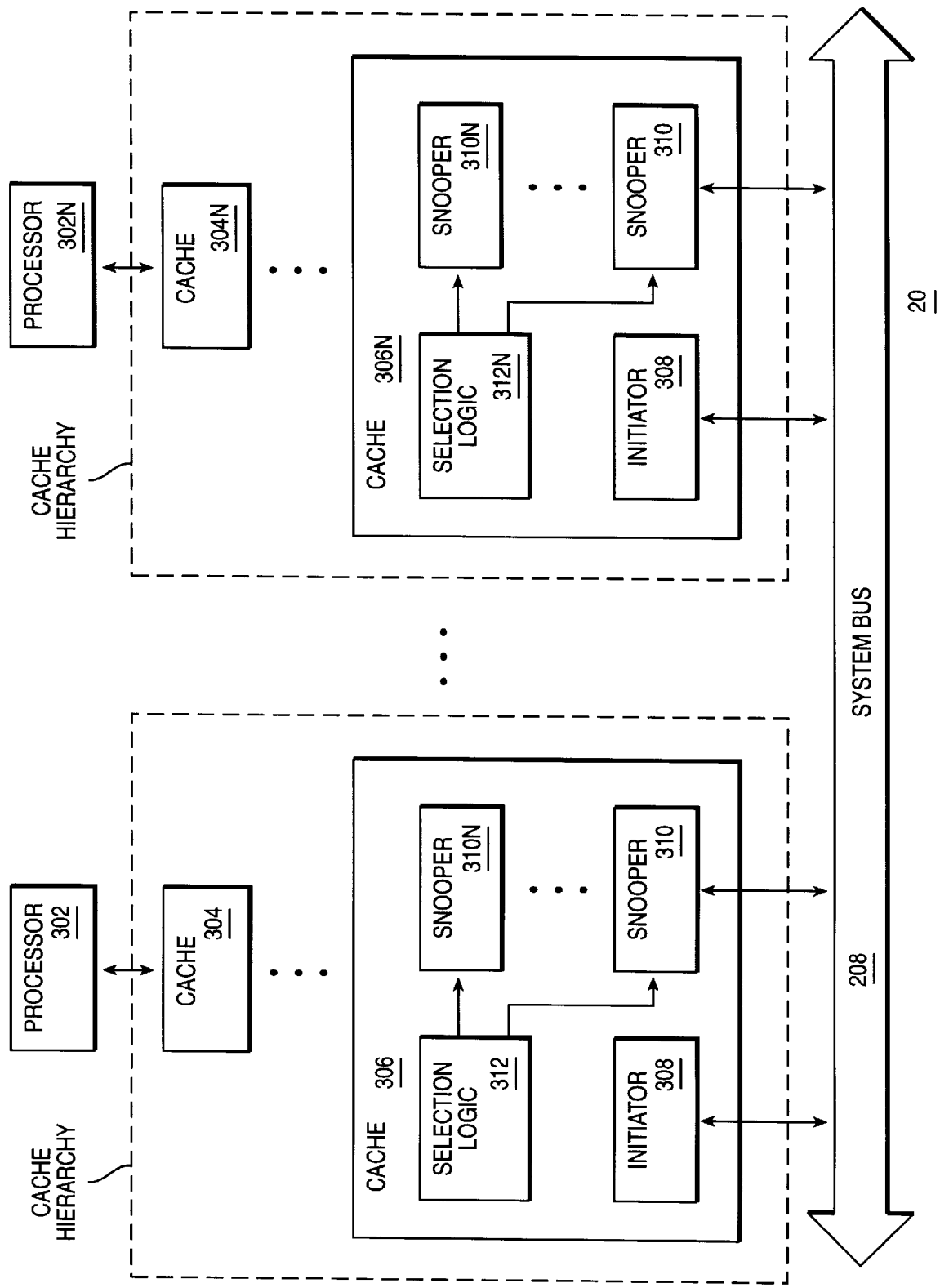
FIG. 3 is a schematic diagram illustrating in greater detail a preferred embodiment of the computer system of FIG. 1 according to the teachings of the present invention.

Reference now being made to FIG. 3 a schematic diagram is shown illustrating in greater detail a preferred embodiment of the computer system 20 of FIG. 1 according to the teachings of the present invention. As shown, the preferred embodiment is a multi-processor (302-n) environment that includes a cache hierarchy (304-n to 306-n).The last cache in the hierarchy (i.e. the one closest to the system bus 208) (306-n) operates in accordance with the protocols of the present invention.

Cache 306 is representative of caches 306-n, and therefore, the discussion hereinafter with respect to cache 306 is equally applicable to caches 306n. Cache 306 includes an initiator 308, one or more snoopers 310-n and selection logic 312. Each cache 306n has the same number of snoopers 310-n.

The protocol of the preferred embodiment of the present invention is divided into two separate parts: an initiator protocol, and a snooper protocol. The initiator and snooper protocols are independent of one another, and communicate by passing transactions over the system bus 208. For clarity, a more basic version of the protocol of the present invention is first described. This basic version of the protocol supports only one operation that is multiply-initiated and multiply-sourced. If the computer system has multiple different operations (say due to different instructions) that are multiply-initiated and multiply-sourced but are otherwise independent of one another, the basic protocol and mechanism of the present invention as described in conjunction with FIGS. 4 and 5 must be replicated for each such operation. An enhancement of the basic protocol that removes this restriction and allows multiple distinct multiply-initiated, multiply-sourced operations to be accommodated without mandatory replication will be described hereinafter as an extension of the basic protocol.

In the preferred embodiment of the present invention, these protocols are implemented via the initiator 308 and snooper 310.

The protocol for the initiator 308 includes the following:
1) the operation is presented to the initiator 308 from the cache above this one (e.g. cache 304); and
2) In response to the above, the initiator 308 presents the operation unto the system bus 208 until it succeeds without RETRY.

For multiply-initiated operations, the initiator 308 usually accepts multiple different instances of the given operation at a time before any given instance is completed. This forms a set of instances of the given operation in progress. Typically, the initiator cycles through operations in this set according to some arbitration policy designed to prevent higher level system deadlocks and facilitate the performance of the overall computer system. No operation is abandoned, but rather, all operations accepted by the initiator 308 are carried through to completion.

Figure 4:
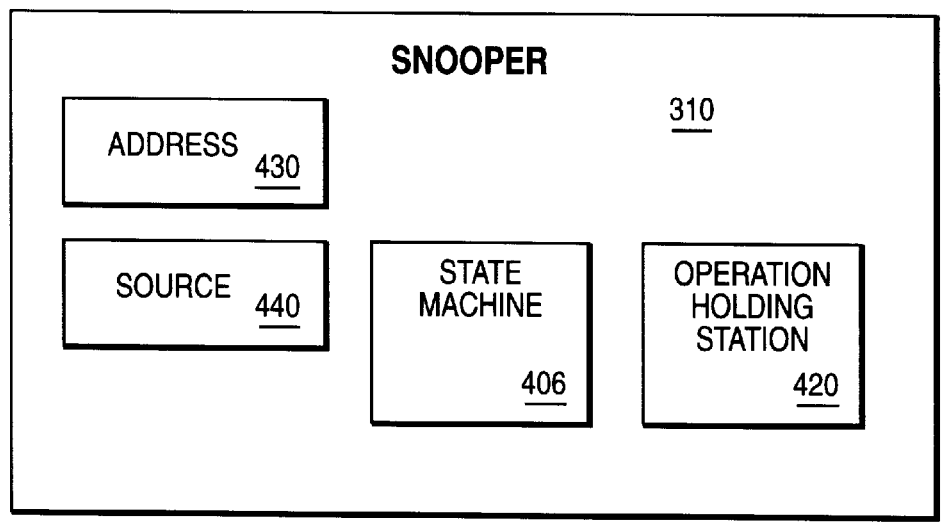
FIG. 4 is a block diagram illustrating in greater detail the snooper of FIG. 3 according to the basic protocol as defined by the teachings of the present invention.

Reference now being made to FIG. 4, a block diagram is shown illustrating in greater detail snooper 310 of FIG. 3 according to the basic protocol as defined by the teachings of the present invention. Snooper 310 includes a state machine 406, an address holding register 430, source holding register 440, and an operation holding station 420.

The operation holding station 420 contains the information from the system bus 208 for the operation that must be propagated up the cache hierarchy in order to perform the given operation.

The address holding register 430 contains the address of the operation from the system bus 208. This address is used to allow the various snoopers 310-n to distinguish between differing instances of the multiply-initiated operation processed by the mechanism of the current invention. State machine 406 implements the snooper protocol which is described in greater detail in connection with FIG. 5 hereinafter.

The source holding register 440 contains an indication from the system bus 208 that denotes which cache 306-n initiated the operation.

Many existing bus protocols have signals dedicated to "tagging" operations and it is often possible to re-use these signals to indicate the participant sourcing an operation onto the bus. If such signals are unavailable or unusable, it is a trivial matter to add a number of additional side-band signals to an existing protocol as an indication of the source of an operation.

It should be noted, however, that the operation holding station 420, source holding register 440, and address holding register are only valid if the state machine 406 is not in the IDLE state.

Figure 5:
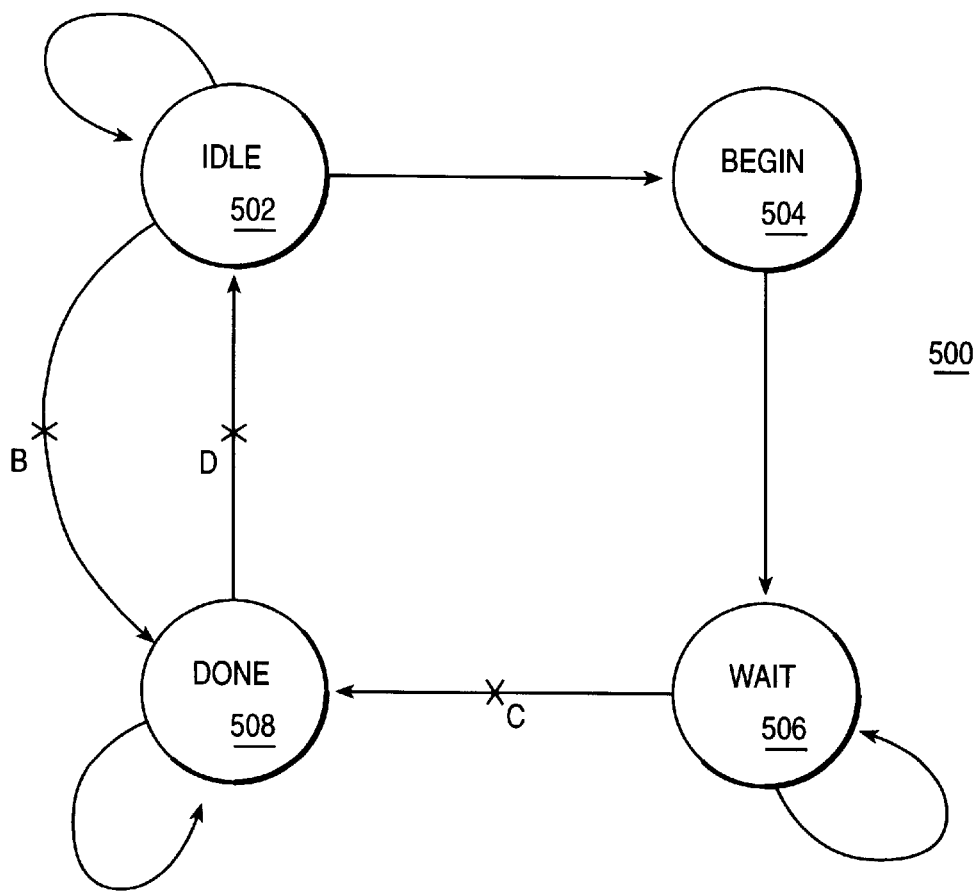
FIG. 5 is a state diagram illustrating the implementation of the state machine of FIG. 4 for executing the basic snooper protocol according to the teachings of the present invention.

Reference now being made to FIG. 5, a state diagram 500 is shown illustrating the implementation of state machine 406 of FIG. 4 for executing the basic snooper protocol according to the teachings of the present invention.

The snooper state machines 406 can proceed according to two distinct paths depending on whether the operation snooped is initiated from the same cache as the snooper is present in or is initiated from a differing cache. As shown in FIG. 5, state machine 406 moves through the following three phases in the protocol when the operation is from a differing cache:

1) waiting for an operation (idle (502));
2) propagating an operation up the hierarchy (begin (504) and wait (506)); and
3) finished propagating the operation, waiting for the operation to be repeated on the system bus (208) so that completion thereof is accomplished (done (508)).

However, when the snooped operation is initiated from the same cache as the snooper, the state machine 406 instead proceeds through a subset of these phases:

1) waiting for an operation (idle (502));
2) finished, waiting for the operation to be repeated on the system bus (208) so that completion thereof is accomplished (done (508)).

The differences between these two cases will be described in greater detail hereinafter. In what follows, a snooper state machine (406) will be referred to as active if the state machine (406) is not in the IDLE state (502). Also, a snooper state machine (406) will be referred to as processing an operation if the state machine is in the BEGIN (504) or WAIT (506) states. In order to further clarify the various aspects of the preferred embodiment of the present invention, state machine 406 is explained hereinafter in connection with caches 306-n.

When an operation to be processed by the mechanism of the current invention is snooped on the system bus, two distinct cases occur. In the first case, the snooped operation's source indication matches that of the cache snooping the operation, and therefore, the operation was initiated onto the system bus by the same cache. This is referred to as a "local" operation. In the second case, the snooped operation's source indication does not match that of the current cache, and therefore, the operation was initiated onto the system bus by a different cache. This is referred to as a "foreign" operation. These differing cases are handled differently by the snooper state machine 406.

Initially, all snoopers 310-n begin in the IDLE state (502). When an operation, handled by the present invention, is placed on the system bus 208, this is detected by selection logic 312. If the selection logic determines that no snooper 310-n is currently active due to the operation and that one or more snoopers 310-n are idle, the selection logic 312 will select a snooper to activate to begin processing the operation. It is not necessary that the selection logic units 312-n in each cache select the same snooper 310 from among the set of snoopers 310-n. It is only necessary that the selection logic units 312-n choose some snooper 310 in each cache 306-n from among the set of snoopers 310-n who are idle. The selection logic determines if any snooper is currently active for the given operation by examining indications from the snoopers 310-n denoting whether the snooped operation matches the one that activated the snooper.

If the operation is a "local" operation, the selected snooper's state machine 406 transitions directly from the IDLE state (502) to the DONE state (508) by means of arc B. There, the initiating snooper's state machine 406 will wait for the operation to be completed by the non-initiating caches 306-n in the system.

However, if the operation is a "foreign" operation, the selected snooper's state machine 406 transitions from the !DLE state (502) to the BEGIN state (504).

It should be noted that when a snooper state machine 406 is first activated by moving out of the IDLE (502) state, the bus operation is retried by that snooper. The operation cannot be allowed to complete on the system bus (208) (no retry) until the operation has been presented to and completed on the processors (302-n) in the system. Therefore, the snooper (310) must retry an operation when first activated to process it. In addition, when a snooper state machine 406 is first activated, the address holding register 430, source holding register 440, and the operation holding station 420 in the corresponding snooper 310 are loaded from the system bus 208.

In the BEGIN (504) state, the snooper 310 takes whatever actions necessary to start propagating the operation up the cache hierarchy. From the BEGIN (504) state, the snooper (310) unconditionally moves to the WAIT (506) state, where it waits for the operation to completely propagate to the top of the cache hierarchy and succeed. When the operation has succeeded on the local processor 302-n, snooper 310 moves through state machine arc C to the DONE (508) state.

If, while processing an operation, the snooper detects (snoops) a re-initiation of the operation on the system bus 208, the snooper 310 will drive a retry indication to the system bus 208. Unrelated operations of the bus protocol not handled by the mechanism of the present invention are ignored by the snooper (310). More specifically, if any of the snoopers 310-n meet the following conditions, then the snooped operation is currently being processed, and the snooped operation is retried:

1) currently in the BEGIN (504) or WAIT (506) state; and
2) the type of operation on the system bus (208) corresponds to the type of operation that the snooper machine is defined to process.
3) the address of the operation on the system bus (208) corresponds to the address held in the snooper address holding register (430).
4) The source of the operation on the system bus (208) corresponds to the source held in the snooper source holding register (440).

If it is determined that a snooper 310 is currently processing the snooped operation, then the snooped operation is re-tried by the snooper 310, and the snooper state machine 406 does not change state due to the snooped operation. On the system bus 208, retry is the logical OR of all the individual retry indications of all participant snoopers 310-n and a retry indication, described later, from the selection logic 312.

Likewise, a similar set of conditions is used by the snoopers 310-n to provide the indicators to the selection logic 312 denoting when a snooper is active due to a currently snooped bus operation. The difference is that a snooper 310-n will indicate that it is active due to a snooped bus operation when in any of the BEGIN (504), WAIT (506), or DONE (508) states, the type of the bus operation matches the operation defined to be processed by the present invention, the source of the operation matches the source in the source holding register 440, and the snooped address matches the address in the address holding register 430. This allows the selection logic 312 to determine when a snooped bus operation already has an activated snooper 310. When the selection logic 312 determines that a snooped bus operation has an activated snooper 310-n, the selection logic 312 takes no further action on the snooped bus operation.

It should be noted, however, that selection logic 312 can retry operations directly. If selection logic 312 detects an operation that should be processed by being presented on the bus, no snoopers 310-n are currently active for this operation, and all snoopers 310-n are currently active, then the selection logic 312 will retry the operation presented on the system bus 208 directly. This set of conditions corresponds to the situation where a new operation is being presented on the system bus 208 for processing, but all of the snoopers 310-n in the caches 306-n in the system are busy. In such a case, the operation must be retried until snoopers 310-n become available to process the operation.

Once a state machine (406) reaches the DONE (508) state, the operation has been successfully completed on the local processor (302-n), and the snooper 310 stops retrying the operation when it is re-presented on the system bus 208. Note that the initiating cache's 306-n snooper proceeded directly to the DONE (508) state and does not retry subsequent re-initiations of the operation. As the activated snoopers 310 processing an operation in the different caches 306-n proceed to the DONE (508) state, eventually no activated snooper 310 will RETRY the operation when re-presented by the initiator (308-n).

Once all activated snoopers 310 cease retry's, the next instance the operation is presented on the system bus 208 will not be retried and the operation is complete. When the activated snoopers 310 detect that the operation has completed, by observing the operation on the system bus (208) without retry, all activated snoopers 310 concurrently move through arc D from the DONE (508)state to IDLE (502) state. This completes the operation and the activated snoopers 310 are available to process the next assigned operation.

This protocol avoids deadlock by having a snooper 310 in every cache 306-n accept the operation at the same time according to an agreed upon condition. In other words, the snooper 310 in a given cache can accept an operation and begin working on it even while retrying the operation, since the snooper 310 can infer that all other caches 306-n in the system except will also, by convention, be accepting the operation and beginning to process it as well.

It should be noted, however, that this condition only holds as long as all caches 306-n have the same number of snoopers 310-n. If this were not the case, a cache with more snoopers 310-n than some other caches in the system could accept and begin processing an additional operation even if the cache with less snoopers had all of its' snoopers active. In this case, the operation would begin processing and could potentially finish on some caches (the ones with a larger number of snoopers 310-n) before beginning processing on the other caches (the ones with a smaller number of snoopers 310-n). This can lead to a ping-pong deadlock. To avoid such difficulties, the present invention requires that each cache 306-n contain the same number of snoopers 310-n.

In addition, to avoid Ping-Pong deadlock, none of the activated snoopers 310 release an operation (proceeds from DONE (508) state to IDLE (502) state) until all of the activated snoopers 310 are finished with the operation. Execution of a given operation is started by a set of activated snoopers 310 at the same time, and finished by these same snoopers 310 at the same time. This prevents the Ping-Pong deadlock by keeping no cache 306-n from beginning or finishing the operation before any of the others.

It is assumed in the description above that the effects of the operation are completed on the local processor 302-n before the operation is presented to the initiator 308. As such, the operation does not need to be propagated from the system bus 208 to the initiating processor 302-n. Therefore, the initiating processor's 302-n snooper 310 proceeds directly to the DONE state via arc B.

It is possible, however, to have a system in which the operation is not completed on the local processor 302-n before being presented to the initiator 308. In such a system, the snooper state machine must be altered to propagate the operation back to the initiating processor 302-n. To perform this alteration, arc B is removed from the state machine depicted in FIG. 5 and all snooper state machines move from the IDLE to BEGIN states. This will cause the snooper in the initiating cache to propagate the operation to the processor at the top of the local cache hierarchy. This change in the protocol is minor and will be apparent to those skilled in the art.

The appropriate implementation choice depends on the whether the operation is completed on the local processor 302-n before being presented to the initiator 308 or if a snooper 310 is expected to present the operation to the local processor 302-n. Having a snooper 310 present the operation to the local processor 302-n is referred to as "self-snooping" as is a technique well known to those skilled in the art.

The basic version of the protocols for the present invention require that the structures of FIGS. 4 and 5 are duplicated for each unique multiply-initiated, multiply-sourced operation present in the system. It is possible, however, to augment the basic protocol of the invention to allow multiple different multiply-initiated, multiply-sourced operations to be processed without mandatory replication of these hardware structures. This protocol will be referred to hereinafter as the advanced protocol.

Figure 6:
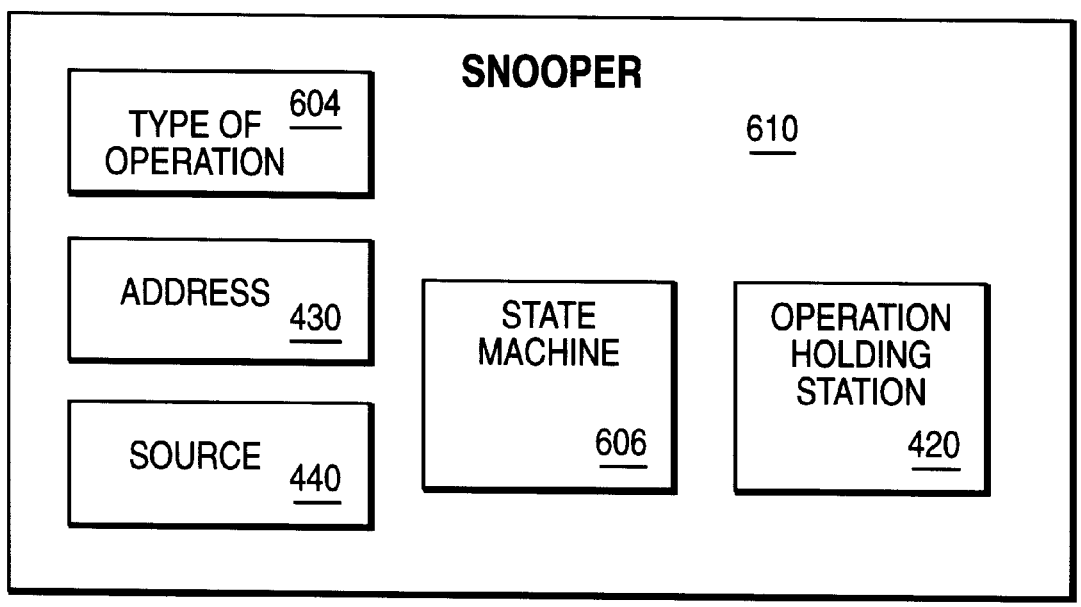
FIG. 6 is a block diagram illustrating in greater detail an enhanced snooper which can be substituted for snoopers of FIG. 3 according to the teachings of the preferred embodiment of the present invention.

Reference now being made to FIG. 6, a block diagram is shown illustrating in greater detail an enhanced snooper 610 which can be substituted for snoopers 310-n of FIG. 3 according to the teachings of the preferred embodiment of the present invention. In comparison with the basic snooper 310 shown in FIG. 4., the enhanced snooper 610 has an additional indicator (604) used to indicate the type of operation being processed.

This "type of operation" indicator 604 is used to maintain, within the various snoopers 610-n, the type of the operation being processed. In similarity to the snooper 310 in the basic protocol, in the advanced protocol snooper 610, this operation type is loaded with the type of operation on the system bus (208) when a snooper state machine 606 is activated (i.e. leaves the IDLE state).

Furthermore, when operations are snooped on the system bus (208) by an active snooper 610, the operation type indicator (604) is compared with the type of operation on the system bus when determining if the operation being presented on the system bus 208 corresponds to the one that activated the snooper 610. This is used by both the snooper state machine 606 to determine whether or not to retry an operation and by the snopper 610 to provide indications to the selection logic 312 as to whether or not the snooped bus operation has a currently active snooper 610. This allows a single snooper 610 the capability to process a number of different multiply-sourced, multiply-initiated transactions, and removes the need to duplicate the snoopers 310-n for each different multiply-sourced, multiply-initiated operation in a system.

Other than the additional operation type indicator 604 and attendant differences in determining when a snooped operation has a currently active snooper, the advanced protocol operates as described for the basic protocol.

The above description of the advanced protocol of the present invention is based on the assumption that the effects of the operations processed by the present invention are complete on the local processor (302-n) before the operation is presented to the initiator 308. If this condition does not hold and the computer system uses self-snooping, the snooper state machine 406 must be altered as described for the basic protocol (removal of arc B and causing snooper state machines to proceed from IDLE to BEGIN states for both "local" and "foreign" operations) to support self-snooping.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus for processing multiple variable delay bus operations while avoiding deadlock, the apparatus comprising:

a plurality of processors for executing instructions;

a cache, for each one of the processors, for storing data and snooping instructions, each cache including:

means for detecting operations which can be sourced by more than one of the processors and which can be initiated by the same processor multiple times;

means for ensuring that a detected operation is accepted by all other caches at substantially the same time by determining when a condition is present in each of said caches based upon the occurrence of said condition in the cache for one of said processors that initiated said detected operation; and means for ensuring that an accepted operation which has been processed to completion is not indicated as being completed until each of the other caches have completely processed the accepted operation;

wherein said deadlock avoidance occurs independent of synchronization operations.

2. The apparatus of claim 1 wherein the means for ensuring that a detected operation is accepted by all other caches at substantially the same time includes:

a plurality of means for processing the detected operation, each one the caches having the same number of processing means.

3. The apparatus of claim 2 wherein the means for ensuring that an accepted operation includes:

means for indicating when an accepted operation has not been completely processed.

4. The apparatus of claim 3 wherein the means for indicating when an accepted operation has not been completely processed is a retry signal.

5. The apparatus of claim 4 wherein the means for ensuring that an accepted operation includes:

means for releasing a processed operation only after there are no more retry signals detected for the processed operation.

6. The apparatus of claim 5 wherein the multiple variable delay bus operations can be of varying types, and each cache further comprises:

means for indicating the type of detected operation.

7. In a multiprocessor system each processor having at least one cache coupled to a system bus, a method of processing multiple variable delay bus operations while avoiding deadlock, the method comprising the steps of:

detecting, on the system bus, operations which can be sourced by more than one of the processors and which can be initiated by the same processor multiple times;

determining when a condition is present in each said cache based upon the occurrence of said condition in the cache associated with one of said processors that initiated a detected one of said operations;

accepting said detected operation in each of the caches at substantially the same time; and indicating that the accepted operation has been processed only after each of the other caches have completed processing the detected operation wherein said deadlock avoidance occurs independent of synchronization operations.

8. The method of claim 7 wherein each one of the caches includes the exact same number of means for processing a detected operation.

9. The method of claim 8 further comprising the step of:

indicating, upon the detection that the same operation has been re-initiated, that the operation has not been processed.

10. The method of claim 9 wherein the step of indicating that the accepted operation has been processed only after each of the other caches have completed processing the detected operation includes the step of:

detecting that an operation has not been processed by the other caches via their respective indications.

11. The method of claim 10 wherein the indication that an operation has not been processed is the assertion of a retry signal.

12. The method of claim 11 wherein the step of indicating that the accepted operation has been processed only after each of the other caches have completed processing the detected operation includes the steps of:

detecting the re-initiation of the accepted operation; and releasing the accepted operation upon detecting the absence of any retry signals by each of the other caches for the accepted operation.

13. The method of claim 12 wherein the detected operation can be of varying types.

14. In a multiprocessor system each processor having at least one cache coupled to a system bus, an apparatus for processing multiple variable delay bus operations while avoiding deadlock, the apparatus comprising:

means for detecting, on the system bus, operations which can be sourced by more than one of the processors and which can be initiated by the same processor multiple times;

means for determining when a condition is present in each said cache based upon the occurrence of said condition in the cache for one of said processors that initiated said operation;

means for accepting a detected operation in each of the caches at substantially the same time; and means for indicating that the accepted operation has been processed only after each of the other caches have completed processing the detected operation;

wherein said deadlock avoidance occurs independent of synchronization operations.

15. The apparatus of claim 14 wherein each one of the caches includes the exact same number of means for processing a detected operation.

16. The apparatus of claim 15 further comprising:

means for indicating, upon the detection that the same operation has been re-initiated, that the operation has not been processed.

17. The apparatus of claim 16 wherein the means for indicating that the accepted operation has been processed only after each of the other caches have completed processing the detected operation includes:

means for detecting that an operation has not been processed by the other caches via their respective indications.

18. The apparatus of claim 17 wherein the indication that an operation has not been processed is the assertion of a retry signal.

19. The apparatus of claim 18 wherein the means for indicating that the accepted operation has been processed only after each of the other caches have completed processing the detected operation includes:

means for detecting the re-initiation of the accepted operation; and means for releasing the accepted operation upon detecting the absence of any retry signals by each of the other caches for the accepted operation.

20. The apparatus of claim 19 wherein the detected operation can be of varying types.

* * * * *